United States Patent Office 3,549,681
Patented Dec. 22, 1970

3,549,681
6-SULFURIC ACID ESTERS OF 6-DEMETHYLTETRACYCLINES
Martin Tobkes, Spring Valley, N.Y., and Raymond George Wilkinson, Columbus, Ohio, assignors to American Cyanamid Company, Stamford, Conn., a corporation of Maine
No Drawing. Continuation-in-part of application Ser. No. 520,640, Jan. 19, 1966. This application Dec. 9, 1966, Ser. No. 600,376
Int. Cl. C07c *103/19, 141/14*
U.S. Cl. 260—457                              10 Claims

ABSTRACT OF THE DISCLOSURE

This disclosure describes 6-sulfuric acid esters of 6-demethyltetracyclines useful as intermediates in the preparation of the corresponding 5a,6-anhydro-6-demethyltetracyclines.

---

This application is a continuation-in-part of our copending application Ser. No. 520,640, filed Jan. 14, 1966, now abandoned.

This invention is concerned with new, highly useful, acid-stable derivatives of the tetracycline type antibiotic compounds. More particularly, it is concerned with 6-sulfuric acid esters of 6-demethyltetracyclines which may be represented by the following general formula:

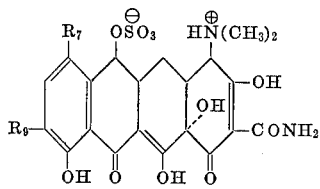

wherein $R_7$ and $R_9$ are the same or different and are each selected from the group consisting of hydrogen, halogen, cyanato, thiocyanato, cyano, nitro, amino, mono (lower alkyl)-amino, di(lower alkyl)amino, lower alkanylamino and phenylazo. Suitable lower alkyl and lower alkanoyl groups contemplated by the present invention are those having up to about 6 carbon atoms whereas halogen is exemplified by fluorine, chlorine and bromine.

The novel compounds of the present invention are prepared, in general, by treatment of an appropriately substituted 6-demethyltetracycline with a sulfonating agent whereby a sulfuric acid ester is formed at the 6-position. This process comprises reacting the appropriately substituted 6-demethyltetracycline in a reaction-inert solvent system with the sulfurtrioxide complexes of N,N-dimethylaniline, dioxane, pyridine, N,N-dimethylformamide, triethylamine, and even sulfurtrioxide itself. Although the pyridine sulfurtrioxide complex, as well as the others listed, can be used in about stoichiometric proportions and excess, generally from about 1 to about 5 molar excess based on the sulfurtrioxide present, is used. The use of greater excesses of the sulfurtrioxide complex offers no advantage over that obtained with about a 4 molar excess. The sulfurtrioxide complexes used as reactants are difficult to obtain pure and to maintain in a pure form. For this reason and to insure as complete utilization of the antibiotic compound as is possible, an excess of the sulfurtrioxide complexes is generally used. The order of preference of the sulfurtrioxide complexes is as follows: pyridine, N,N-dimethylformamide, dioxane and N.N-dimethylaniline; by reason of their ease of preparation and handling and the yields of 6-sulfuric acid ester produced.

The sulfurtrioxide complexes utilized as reactants can also be produced in situ. In one modification of the process of this invention, the sulfurtrioxide is added to a solution of the appropriately substituted 6-demethyltetracycline and the sulfurtrioxide carrier, for example, pyridine, in a suitable solvent. The molar ratio of sulfurtrioxide to sulfurtrioxide carrier should be at least 1:1. In the case of dioxane, the sulfurtrioxide complex formed may contain 1 or 2 moles of sulfurtrioxide per mole of dioxane. Indeed, in most instances, a mixture of the mono- and di-complexes is generally present. This is true even when the sulfurtrioxide complex is preformed since it is not necessary to isolate a pure complex. In still another modification of the process of this invention, the tertiary organic base-sulfurtrioxide complex is prepared in situ by reacting the tertiary organic base, for example, pyridine, with chlorosulfonic acid as the sulfurtrioxide source, in a 2:1 molar ratio.

Solvent systems suitable for the process of this invention include, for example, ethylenedichloride, tetrahydrofuran, dioxane, N,N-dimethylformamide, dimethylsulfoxide, 1,2-dimethoxyethane and diethyleneglycol diethylether or mixtures thereof. These solvents should be employed in the anhydrous state. Temperature is not a critical factor. Temperatures of from about —50° C. to about 100° C. can be employed. A temperature of from about 20° C. to about 70° C. is, however, preferred since it produces the desired products in good yield. Higher temperatures, while operative, tend to result in diminished yields. The in situ product of the sulfurtrioxide complex, particularly via the reaction of chlorosulfonic acid and, for example, pyridine, is advantageously conducted at a temperature of about —50° to about 10° C. in order to avoid side reactions. Once the in situ formation of the sulfurtrioxide complex is completed, the reaction temperature can, if desired, be increased up to about 100° C.

The time of reaction is likewise not a critical factor. The time necessary to obtain substantially complete reaction varies, of course, with the reaction of temperature and the reactivity of the particular sulfurtrioxide complex used. In the preferred temperature range of from about 20° C. to about 70° C., a reaction period of from about 3 hours to about 20 hours results in substantial conversion of the appropriately substituted 6-demethyltetracycline to the desired 6-sulfuric acid ester.

The products are recovered from the reaction mixture by conventional methods, e.g., by filtration. Optimum recovery is obtained by addition of a solvent, such as water or methanol, which is miscible with the reaction solvent but which is non-solvent for the product. The products thus obtained are slurried, preferably with dilute aqueous hydrochloric acid, to facilitate removal of the sulfurtrioxide carrier, then filtered and dried. Washing with a volatile organic solvent can be used to expedite drying.

The novel compounds of the present invention are useful as intermediates in the preparation of the corresponding 5a,6-anhydro-6-demethyltetracyclines. This conversion may be readily carried out in excellent yield merely by dissolution of the 6-sulfuric acid ester of a 6-dimethyltetracycline in an aqueous solution in an alkali metal hydroxide such as sodium hydroxide or potassium hydroxide. Although the concentration of alkali metal hydroxide is not critical, preferred concentrations is about at 1 normal solution of sodium hydroxide or potassium hydroxide in water. This conversion is conveniently carried out at about room temperature for a period of time of from about 15 minutes to about 2 hours or more. The 5a,6-anhydro-6-demethyltetracyclines are of value as germicides since these compounds show a bactericidal effect against a large number of Gram-positive and Gram-negative bacteria.

The following examples are given by way of illustration and are not to be regarded as limitations of this invention, many variations of which are possible without departing from the spirit or scope thereof.

EXAMPLE 1

Preparation of 6-demethyltetracycline-6-sulfuric acid ester

To a stirred solution of 2.15 grams (0.005 mole) of anhydrous 6-demethyltetracycline in a mixture of 3 milliliters of dry dimethylformamide and 40 milliliters of dry tetrahydrofuran is added 3.18 grams (0.02 mole) of pyridinesulfurtrioxide complex. The mixture is stirred for 20 hours at room temperature. The solvent is decanted and discarded. The residual crude solid is shaken with 15 milliliters of 2% hydrochloric acid for 10 minutes, then filtered and thoroughly washed with methanol followed by ether. The pale yellow sulfuric acid ester melts at 194°–200° C. (decomposition).

The infrared spectrum (KBr) of 6 - demethyltetracycline-6-sulfuric acid ester exhibits strong absorption maxima at 3.00, 3.53, 6.00, 6.18, 6.32, 6.85, 7.58, 8.11, 8.37, 9.61, 10.12, 11.00, 11.64, 12.65 and 14.40 microns. It exhibits maxima in the ultraviolet region at 267 m$\mu$ and 335 m$\mu$ with log $\epsilon$ values of 4.29 and 4.17 respectively, when dissolved in 0.1 N $H_2SO_4$ and in the ultraviolet and visible regions at 269 m$\mu$ and 424 m$\mu$ with log $\epsilon$ values of 4.63 and 4.07 respectively in 0.1 N HaOH solution.

Paper chromatography using Whatman paper No. 1 with 0.3 M phosphate buffer at pH 2.0 as stationary phase and butanol saturated with stationary phase as mobile phase gives an R$f$ value of 0.25.

EXAMPLE 2

Preparation of 7-chloro-6-demethyltetracycline-6-sulfuric acid ester

The procedure of Example 1 is followed with the exception that 2.33 grams (0.005 mole) of anhydrous 7-chloro-7-demethyltetracycline comprises the starting material. The sulfuric acid ester had the following characteristics. The infrared spectrum (KBr) of 7-chloro-6-demethyltetracycline-6-sulfuric acid ester exhibits strong absorption maxima at 2.98, 6.02, 6.18, 6.36, 6.87, 8.30, 9.52, 10.07, 10.47, 10.84, 11.70, 12.22 and 14.40 microns. It exhibits maxima in the ultraviolet region at 230, 267 and 366 m$\mu$ with log $\epsilon$ values of 4.16, 4.25 and 4.09 respectively, when dissolved in 0.1 N $H_2SO_4$ and in the ultraviolet and visible regions at 269 and 426 m$\mu$ with log $\epsilon$ values of 4.59 and 4.04 respectively, in 0.1 N NaOH solution.

Paper chromatography using Whatman paper No. 1 with 0.3 M phosphate buffer at pH 2.0 as stationary phase and butanol saturated with stationary phase as mobile phase gives an R$f$ value of 0.29.

EXAMPLE 3

Preparation of 7-chloro-6-demethyl-9-nitrotetracycline-6-sulfuric acid ester

The procedure of Example 1 is followed with the exception that 1.33 grams of 7-chloro-6-demethyl-9-nitrotetracycline comprises the starting material. The sulfuric acid ester had the following characteristics. The infrared spectrum (KBr) exhibits strong absorption maxima at 2.95, 6.02, 6.14, 6.31, 6.54, 7.02, 7.42. 8.23, and 9.50 microns. It exhibits maxima in the ultraviolet region at 256 and 376 m$\mu$ with log $\epsilon$ values of 4.43 and 4.12 respectively, when dissolved in 0.1 N $H_2SO_4$ and in the ultraviolet and visible regions at 260 and 465 m$\mu$ with log $\epsilon$ values of 4.45 and 4.16 respectively, in O.1 N NaOH solution.

Paper chromatography using Whatman paper No. 1 with 0.3 M phosphate buffer at pH 2.0 as stationary phase and butanol saturated with stationary phase as the mobile phase gives an R$f$ value of 0.29.

EXAMPLE 4

Conversion of 7-chloro-6-demethyltetracycline-6-sulfuric acid ester to 5a,6 - anhydro-7-chloro-6-demethyltetracycline A stirred suspension of 3.00 grams (0.0053 mole) of 7-chloro-6-demethyltetracycline-6-sulfuric acid ester in 50 milliliters of 1 N aqueous sodium hydroxide is adjusted to pH 12 with 50% aqueous sodium hydroxide. The resultant solution gradually deposits a precipitate during the course of 2 hours stirring at room temperature. The product is filtered off and dried in vacuo, giving an orange-brown solid whose elemental analysis agrees with that of a hexahydrate of the tetrasodium salt of 5a,6-anhydro-7-chloro-6-demethyltetracycline. It exhibits a maximum in the ultraviolet region at 270 m$\mu$ with a log $\epsilon$ value of 4.61 and at 425 m$\mu$ in the visible region with a log $\epsilon$ value of 3.80 when dissolved in 0.1 N $H_2SO_4$. In 0.1 N NaOH solution maxima are found at 268 m$\mu$ and 425 m$\mu$ with respective log $\epsilon$ values of 4.56 and 3.79.

Paper chromatography using Whatman paper No. 1 with 3.0 M phosphate buffer at pH 2.0 as stationary phase and butanol saturated with stationary phase as mobile phase gives an R$f$ value of 0.72. In the same system, substituting as mobile phase the upper layer of a solvent mixture prepared by shaking 5 volumes of n-butyl acetate with 4 volumes of 0.3 M pH 2.0 phosphate buffer and 1 volume of 5% trichloracetic acid, an R$f$ value of 0.68 is obtained.

EXAMPLE 5

Conversion of 6-demethyltetracycline-6-sulfuric acid ester to 5a,6-anhydro-6-demethyltetracycline The procedure of Example 4 is followed with the exception that 5.0 grams (0.00887 mole) of 6-demethyltetracycline-6-sulfuric acid ester comprised the starting material and that a final pH adjustment to 5.9 was made prior to filtration. The orange product (5a,6 - anhydro-6-demethyltetracycline) exhibits ultraviolet absorption maxima at 222 and 270 m$\mu$ and visible region absorption at 425 m$\mu$ when dissolved in 0.1 N $H_2SO_4$. In 0.1 N NaOH solution maxima are observed at 268 and 424 m$\mu$.

Paper chromatography in the butanol pH 2.0 system (described in Example 4) gives an R$f$ of 0.72; in the butyl acetate pH 2.0 system an R$f$ of 0.53 is obtained.

EXAMPLE 6

Conversion of 7-chloro-6-demethyl-9-nitrotetracycline-6-sulfuric acid ester to 5a,6-anhydro-7-chloro-6-demethyl-9-nitrotetracycline The procedure of Example 5 is followed with the exception that the starting material is the 6-sulfuric acid ester of 7-chloro - 6 - demethyl-9-nitrotetracycline. The product in 0.1 N $H_2SO_4$ gives absorption maxima at 263 and 450 m$\mu$ with log $\epsilon$ values of 4.64 and 4.26 respectively. In 0.1 N NaOH the maxima are shifted to 267 and 460 m$\mu$ with log $\epsilon$ values of 4.50 and 4.26 respectively. paper chromatograms in butanol pH 2.0 show an R$f$ value of 0.70.

EXAMPLE 7

By using the procedure described in Example 1, the following 6-demethyltetracyclines are converted in good yield to their corresponding 6-sulfuric acid esters: 9-nitro-6-demethyltetracycline, 9-amino-6-demethyltetracycline, 7-cyanato - 6 - demethyltetracycline, 9-thiocyanato-6-demethyltetracycline, 7-phenylazo-6-demethyltetracycline, 7-dimethylamino - 6 - demethyltetracycline, 7-bromo-6-demethyltetracycline, 7 - chloro-9-acetylamino-6-demethyltetracycline and 7-amino-6-demethyltetracycline.

What is claimed is:

1. A compound of the formula:

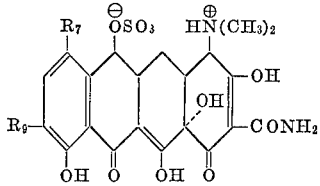

wherein $R_7$ is selected from the group consisting of hydrogen, halogen, cyanato, thiocyanato, cyano, nitro, amino, mono(lower alkyl)amino, di(lower alkyl)amino, lower alkanoylamino and phenylazo and $R_9$ is selected from the group consisting of hydrogen, halogen, cyanato, thiocyanato, cyano, nitro, amino, mono(lower alkyl)amino, di(lower alkyl)amino, lower alkanoylamino and phenylazo.

2. A compound according to claim 1 wherein $R_7$ is hydrogen and $R_9$ is hydrogen.

3. A compound according to claim 1 wherein $R_7$ is chloro and $R_9$ is hydrogen.

4. A compound according to claim 1 wherein $R_7$ is chloro and $R_9$ is nitro.

5. A compound according to claim 1 wherein $R_7$ is nitro and $R_9$ is hydrogen.

6. A compound according to claim 1 wherein $R_7$ is hydrogen and $R_9$ is bromo.

7. A compound according to claim 1 wherein $R_7$ is amino and $R_9$ is nitro.

8. A compound according to claim 1 wherein $R_7$ is hydrogen and $R_9$ is cyano.

9. A compound according to claim 1 wherein $R_7$ is dimethylamino and $R_9$ is hydrogen.

10. A compound according to claim 1 wherein $R_7$ is hydrogen and $R_9$ is methylamino.

References Cited

UNITED STATES PATENTS 3,038,908  6/1962  Beereboom _____ 260—346.2
3,239,499  3/1966  Rennhard et al. _____ 260—192

LEON ZITVER, Primary Examiner

L. B. DE CRESCENTE, Assistant Examiner

U.S. Cl. X.R.

260—174, 192, 453, 454, 465, 559, 999